(12) United States Patent
Kim et al.

(10) Patent No.: US 7,236,662 B2
(45) Date of Patent: Jun. 26, 2007

(54) MODE CONVERTER DEVICE USING OMNIDIRECTIONAL REFLECTORS

(75) Inventors: Young-hun Kim, Seoul (KR);
Hong-seok Lee, Seongnam-si (KR);
Seong-mo Hwang, Suwon-si (KR);
Seung-ho Nam, Seongnam-si (KR);
Young-chan Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/012,311

(22) Filed: Dec. 16, 2004

(65) Prior Publication Data

US 2005/0135739 A1 Jun. 23, 2005

(30) Foreign Application Priority Data

Dec. 17, 2003 (KR) ...................... 10-2003-0092508

(51) Int. Cl.
*G02B 6/42* (2006.01)
(52) U.S. Cl. ....................................... 385/28
(58) Field of Classification Search ..................... None
See application file for complete search history.

(56) References Cited

U.S. PATENT DOCUMENTS

| 6,404,952 | B1 | 6/2002 | Danziger |
| 2002/0025130 | A1* | 2/2002 | Fink et al. ................... 385/127 |
| 2002/0118916 | A1* | 8/2002 | Lee et al. ...................... 385/28 |
| 2002/0191929 | A1 | 12/2002 | Fink et al. |
| 2004/0156589 | A1* | 8/2004 | Gunn et al. ................... 385/37 |

FOREIGN PATENT DOCUMENTS

WO WO 03/023473 A1 3/2003

OTHER PUBLICATIONS

Galarza M et al., "Mode-Expanded 1.55-MUM INP-INGAASP Fabry-Perot Lasers Using Arrow Waveguides for Efficient Fiber Coupling", IEEE Journal of Selected Topics in Quantum Electronics, IEEE Service Center, US, vol. 8, No. 16, Nov. 2002, pp. 1389-1398, XP001175370.

Fenner Milton A et al., "Mode Coupling in Optical Waveguides Horns", IEEE Journal of Quantum Electronics, IEEE Inc. New York, US, vol. QE-13, No. 10, Oct. 1977, pp. 828-835, XP000563351.

Hadley G R;, "Design of Tapered Waveguides for Improved Output Coupling", IEEE Photonics Technology Letters, IEEE Inc. New York, US, vol. 5, No. 9, Sep. 1, 1993, pp. 1068-1070, XP000414180.

Japanese Abstract No. 2001051244, dated Feb. 23, 2001.

* cited by examiner

*Primary Examiner*—Sung Pak
*Assistant Examiner*—Hoang Tran
(74) *Attorney, Agent, or Firm*—Sughrue Mion, PLLC

(57) ABSTRACT

Provided is a mode converter for use in optical communication. The mode converter includes a first waveguide, a second waveguide optically coupled into the first waveguide, and omnidirectional reflectors that are disposed on either side of the first waveguide and have forward reflectivity with respect to a mode propagating in the first waveguide. The mode converter provides minimum loss coupling between either optical fiber or low index difference waveguide and a high index contrast waveguide. Furthermore, the mode converter achieves high, bi-directional optical coupling over a wide wavelength range with a simple manufacturing process.

23 Claims, 8 Drawing Sheets

MODE CONVERTER DEVICE USING OMNIDIRECTIONAL REFLECTORS

BACKGROUND OF THE INVENTION

This application claims priority from Korean Patent Application No. 2003-92508, filed on Dec. 17, 2003, in the Korean Intellectual Property Office, the disclosure of which is incorporated herein in its entirety by reference.

1. Field of the Invention

The present invention relates to an optical mode converter using omnidirectional reflectors, and more particularly, to an optical mode converter designed to minimize coupling loss through mode conversion between either an optic fiber or a laser diode and a waveguide through which light is transmitted.

2. Description of the Related Art

In recent years, there has been rapid growth in high-speed Internet access services offered via a communication network such as Asynchronous Digital Subscriber Line (ADSL) or Very-High-Data-Rate DSL (VDSL) by connecting between an Internet Service Provider (ISP)'s sending terminal and a subscriber's terminal via an optic fiber.

An optical transmitter-receiver (hereinafter transceiver) is essentially required for implementing an optical network. The optical transceiver converts a digitized electric signal to an optical signal within an arbitrary wavelength band for transmission through an optic fiber, and vice versa.

For the optical transceiver, it is very important to reduce coupling loss between an optic fiber that transmits external transmit/receive signals and an optical waveguide through which signals are transmitted. The waveguide is composed of a central core and a cladding layer surrounding the core. The core has a refractive index higher than that of the cladding layer. The total reflection due to the refractive index difference within the waveguide causes light to propagate through the core.

In this case, for a beam to propagate through the waveguide or optic fiber, the beam must meet certain propagation conditions. The beam is called a mode, and a mode size (beam diameter) is inversely proportional to a refractive index difference between the core and the cladding layer. A single mode optic fiber with low signal loss is commonly used for signal transmission. The single mode optic fiber typically has a large mode size of about 10 μm due to a small refractive index difference.

Since a mode size decreases as a refractive index difference between a core and a cladding layer increases, a waveguide can have a core with a small cross-section and realize a small bending radius due to low bending loss, thereby reducing the overall size and cost. For example, when the core is made of silicon (Si) with a refractive index of about 3.5 and the cladding layer is made of silicon dioxide ($SiO_2$) with a refractive index of about 1.5, the waveguide has a refractive index difference greater than 130% and can realize a core size of sub-micrometers.

In general, a mode converter uses a tapered waveguide with a progressively increasing or decreasing width or thickness. However, for a high index contrast waveguide designed for a low price, ultraslim optical device, mode conversion cannot be achieved based on typical tapering since it has a very small mode size.

U.S. Patent Publication No. 2002/0118916 A1 has proposed a mode-size converter between a low index difference optic fiber and a high index contrast waveguide. The proposed mode converter includes a tapered low index difference waveguide with a width that gradually decreases for coupling with an optic fiber and a tapered high index contrast waveguide with a width that gradually increases in opposite direction in order to provide low loss coupling with the low index difference waveguide. The two waveguides are configured to overlap, so that a tapered region of the high index contrast waveguide is embedded within a tapered region of the low index difference waveguide.

The optical mode converter configured so that the two tapered regions overlap each other is not only difficult to actually realize due to an extremely complicated manufacturing process, but also has not sufficiently high optical coupling efficiency (75% coupling efficiency at wavelength of 1.55 μm)

SUMMARY OF THE INVENTION

The present invention provides an optical mode converter with increased coupling efficiency.

According to an aspect of the present invention, there is provided a mode converter device that includes a substrate, a first waveguide formed on the substrate, a second waveguide formed on the substrate and optically coupled into the first waveguide, and omnidirectional reflectors that are disposed on either side of the first waveguide and have omnidirectional reflectivity with respect to a mode propagating in the first waveguide.

The first waveguide has a refractive index lower than that of the second waveguide. The first and second waveguides may be made of $SiO_2$ and Si or SiN, respectively. The omnidirectional reflector is composed of a multilayer stack of alternating $Si/SiO_2$ layers. The space between the omnidirectional reflectors disposed on either side of the first waveguide is linearly or non-linearly tapered toward the second waveguide. One end of the second waveguide connected to the first waveguide may have an acicular shape. Furthermore, the mode converter device further includes an air gap sandwiched between the first waveguide and the omnidirectional reflector.

The exemplary embodiments of the present invention provide a novel mode-size converter designed to achieve minimum loss coupling between either an optical fiber or a low index difference waveguide and a high index contrast waveguide using omnidirectional reflectors. The exemplary embodiments of the present invention can realize a mode-size converter to achieve high optical coupling efficiency in both directions over a wide range of wavelength bands with a simple manufacturing process.

BRIEF DESCRIPTION OF THE DRAWINGS

The above and other features and advantages of the present invention will become more apparent by describing in detail exemplary embodiments thereof with reference to the attached drawings in which:

FIG. 4 shows the result of a simulation of a mode converter with omnidirectional reflectors according to an exemplary embodiment of the present invention, and more particularly.

FIG. 5 shows the result of a simulation of a conventional mode converter without omnidirectional reflectors, and more particularly.

DETAILED DESCRIPTION OF THE ILLUSTRATIVE, NON-LIMITING EMBODIMENTS OF THE INVENTION

Figure 1:
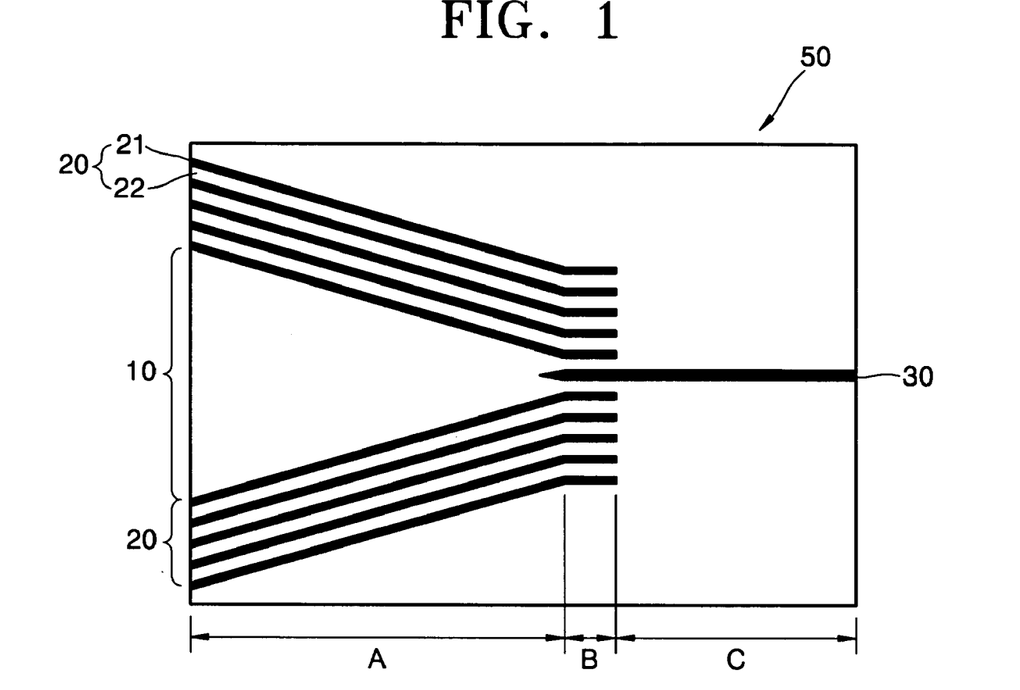
FIG. 1 is a plan view schematically illustrating the structure of a mode converter according to an exemplary embodiment of the present invention.
Figure 2:
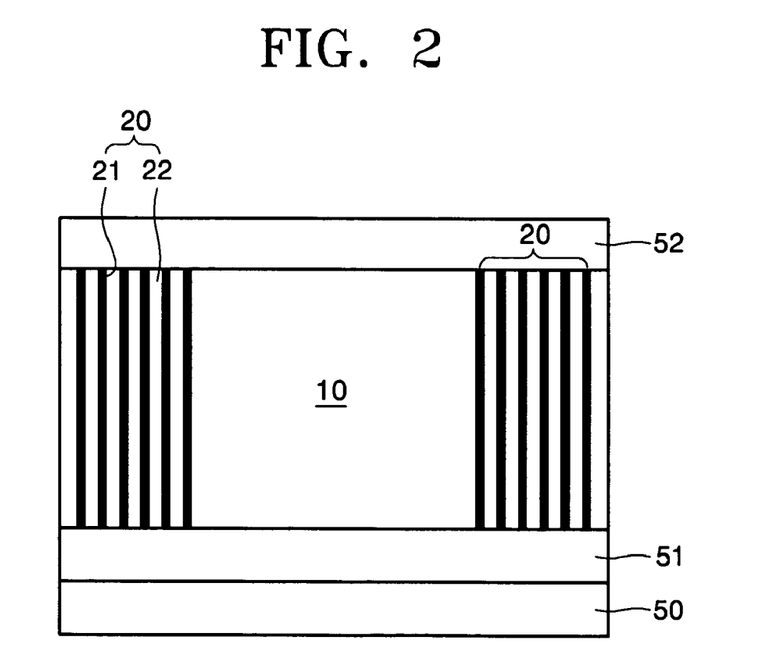
FIG. 2 is a cross-sectional view of the first waveguide with a low refractive index in the mode converter of FIG. 1.
Figure 3:
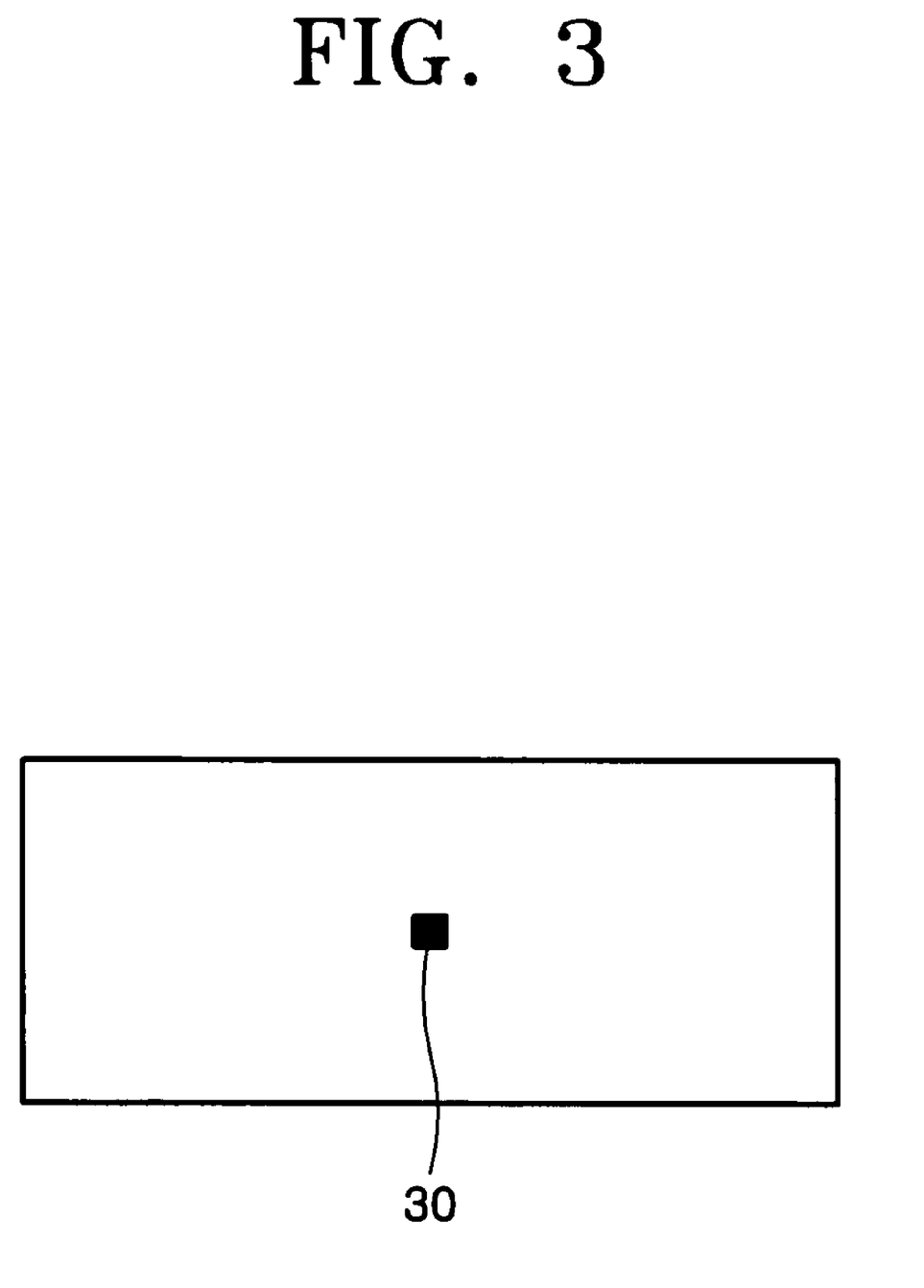
FIG. 3 is a cross-sectional view of the second waveguide with a high refractive index in the mode converter of FIG. 1.

Referring to FIGS. 1–3, a first waveguide 10 with a low refractive index and a second waveguide 30 with a high refractive index are embedded in a substrate 50. The first waveguide 10 is disposed on a first waveguide region A and, for example, corresponds to an optical fiber with a mode size of 10 µm. The second waveguide 30 is disposed on a second waveguide region C and, for example, has a mode size less than 1 µm. The first and second waveguides 10 and 30 overlap each other on a coupling region B between the first and second waveguide regions A and B.

Omnidirectional reflectors 20 are disposed on either side of the first waveguide on the first waveguide region A and converge a mode propagating through the first waveguide 10 onto the coupling region B for coupling into the second waveguide 30. In this case, the first waveguide 10 is tapered down in the direction of mode propagation. While the tapering shape is linear as shown in FIG. 1, it may be curved like an exponential or elliptic function. The tapering shape of the first waveguide 10 will be described later in more detail.

Since the omnidirectional reflectors 20 disposed on either side of the first waveguide 10 exhibit high reflectance at all incident angles of a mode, a propagating mode is confined in the first waveguide 10 and most mode excluding internal loss is converged onto the second waveguide 30. The omnidirectional reflectors 20 are composed of a periodic stack of two or more material layers 21 and 22 having different refractive indices. Cladding layers 51 and 52 are disposed below and above the first and second waveguides 10 and 30 and the omnidirectional reflectors 20, respectively, and the multilayer stack is formed on the substrate 50.

In an exemplary embodiment of the present invention, the first waveguide 10 is made of a material having the same refractive index as that of an optical fiber being used. For example, since the core of the optical fiber is made of $SiO_2$, the first waveguide 10 may be made of $SiO_2$. When the first waveguide 10 is made of the same material as that of the optical fiber in this way, reflection due to a refractive index difference does not occur between them. Thus, the mode can be incident into the first waveguide 10 from the optical fiber with high efficiency without any reflection loss. The mode with a large size incident from the optical fiber becomes progressively smaller as it passes through the first waveguide 10 bound between the omnidirectional reflectors 20 and is coupled into the second waveguide 30 made of $SiO_2$ or SiN with high refractive index. In this case, when the second waveguide 30 has an acicular front end in the coupling region B, the mode size transiently increases at the front end, thus improving coupling efficiency.

The omnidirectional reflectors 20 are constructed as a stack of layers of two materials with different refractive indices and two adjacent layers having an optimized spacing such that reflection occurs at all incident angles in a specific wavelength region. The omnidirectional reflectors 20 are also used as a wavelength filter to selectively transmit light according to its wavelength by adjusting the layer spacing and stacking sequence in the multilayer stack. For example, when the omnidirectional reflector 20 is composed of a stack of six pairs of two Si (with refractive index of 3.7 and thickness of 112.1 nm)/$SiO_2$ (with refractive index of 1.5 and thickness of 276.4 nm) layers, the result of experiment shows total reflection occurs in the wavelength region from 1,300 to 1,700 nm. Since the wavelength region contains optical communication wavelength range from 1,300 to 1,500 nm, the present invention can be applied to optical communication devices.

Figure 4A:
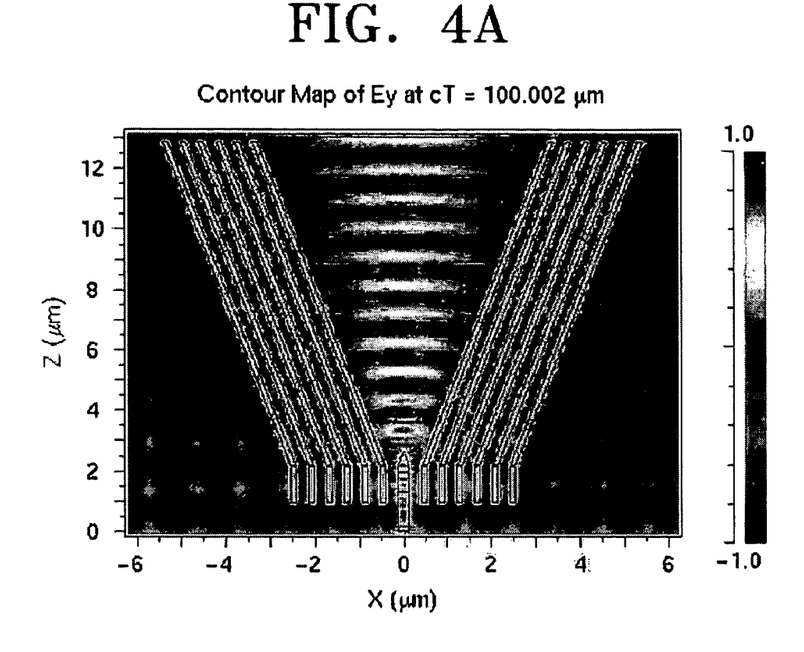
FIGS. 4A and 4B are a graph illustrating energy distribution in a waveguide and a graph of reflectance vs. coupling ratio, respectively.

FIGS. 4 and 5 show results of simulations of a mode converter with omnidirectional reflectors according to an exemplary embodiment of the present invention and a conventional mode converter without omnidirectional reflectors, respectively.

Figure 5A:
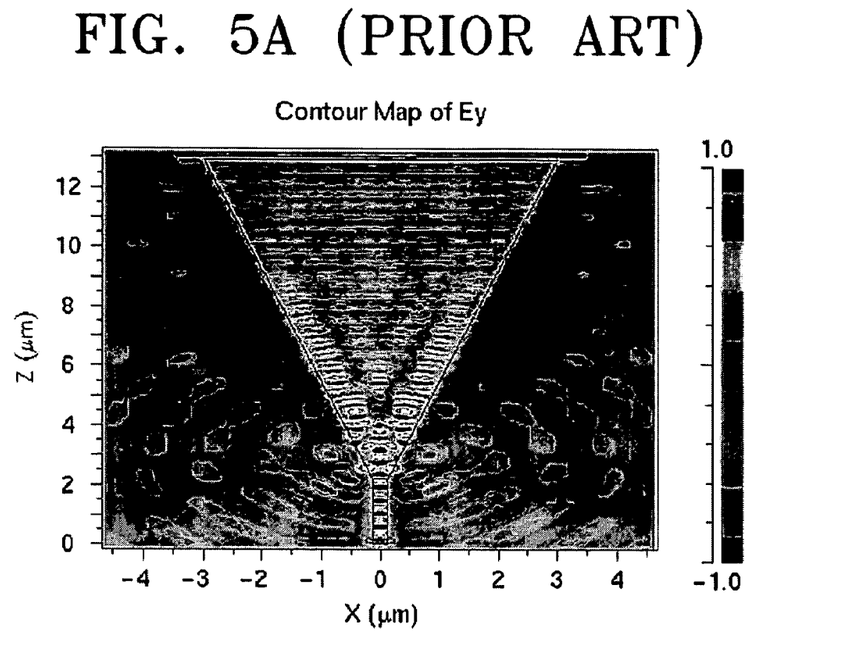
FIGS. 5A and 5B are a graph illustrating energy distribution in a waveguide and a graph of reflectance vs. coupling ratio, respectively.
Figure 5B:
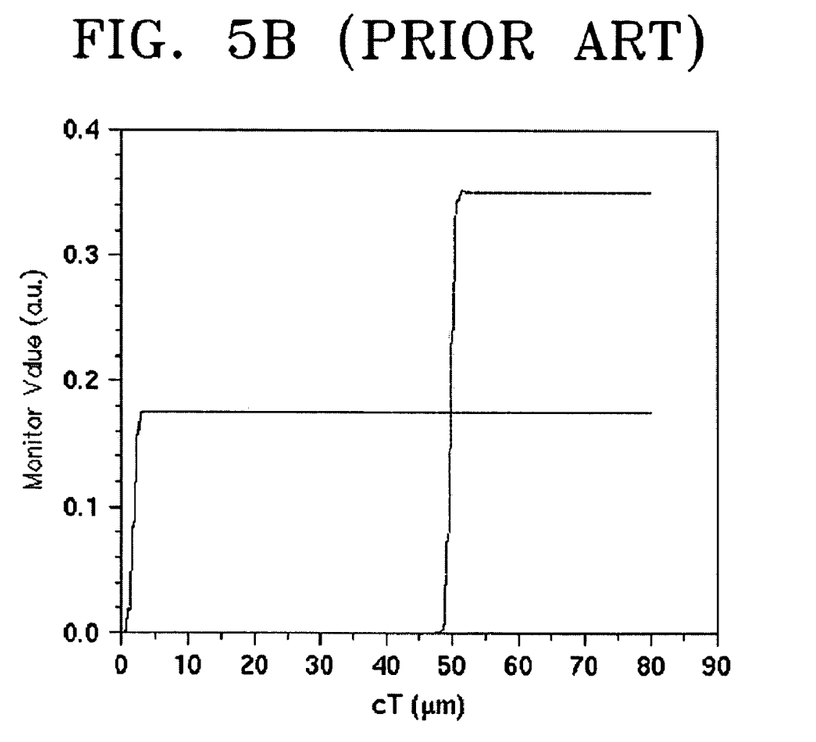

First, FIG. 5A shows a contour map of energy distribution in the conventional mode converter without omnidirectional reflectors, and FIG. 5B is a graph illustrating a simulation result of coupling efficiency. As is evident by FIG. 5A, energy is distributed inside and outside a waveguide, and in particular, energy is very densely distributed around a coupling region where coupling with high refractive index waveguide occurs. This means inefficient mode propagation between waveguides, and energy leakage is expressed numerically in FIG. 5B. As is evident by FIG. 5B, about 20% of light is reflected back into an optical fiber and the conventional mode converter exhibits 35% coupling efficiency (4.5 dB). This low coupling efficiency is attributed to two factors: a large refractive index difference between the optical fiber and waveguide and high losses due to mode mismatch therebetween. That is, the conventional-mode converter suffers high losses due to a large index difference between the optical fiber (refractive index of 1.5) and the silicon waveguide (refractive index of 3.5) and mode size mismatch.

Conversely, as is evident by the simulation result of the mode converter according to the exemplary embodiments of the present invention, energy is distributed only inside the waveguide, which means that there is no leakage of mode propagating in the waveguide due to the presence of omnidirectional reflectors. Thus, the exemplary embodiments of the present invention guide the propagation of light waves using omnidirectional reflectors while significantly reducing the losses due to a refractive index difference.

Figure 4B:
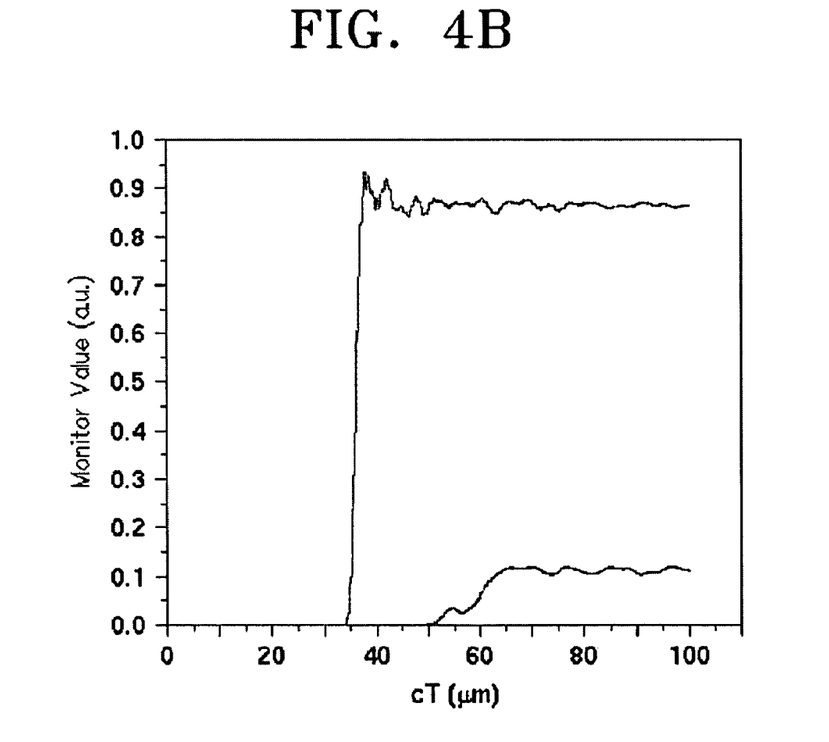

That is, light incident from the optical fiber is coupled into a high refractive index waveguide with little loss. In this case, to reduce loss due to a mode mismatch, an acicular taper is formed at the front end of the high refractive index waveguide. Although a mode size of the high refractive index waveguide is very small, decreasing the size of the waveguide results in a transient increase in the mode size. Thus, it is possible to reduce the loss due to a mode size mismatch. When a 5 μm mode from a lensed fiber is coupled into a 0.25 μm high refractive index waveguide using the mode converter according to an exemplary embodiment of the present invention, coupling efficiency approaches 90% (0.05 dB) and the amount of light reflected into the optical fiber is less than 10% as illustrated in FIG. 4B.

Figure 6A:
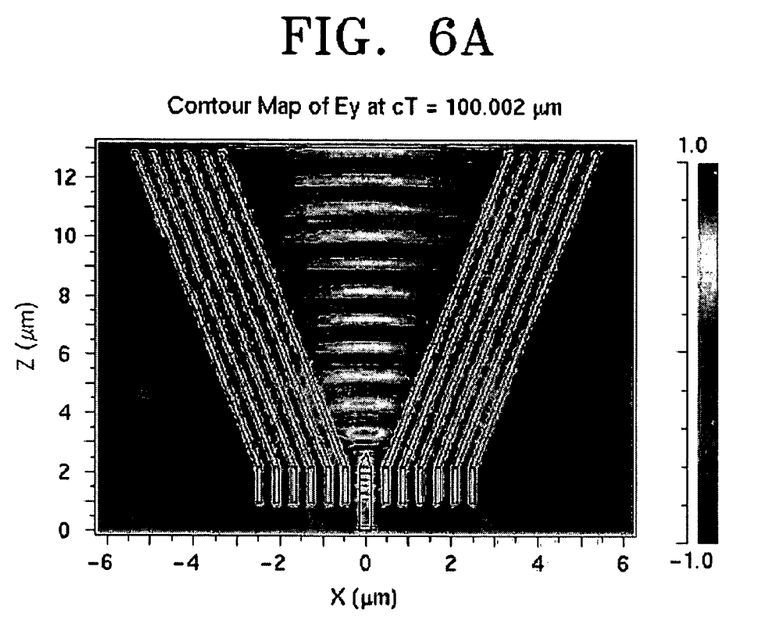
FIG. 6A shows the result of simulation of light propagating from a high refractive index waveguide to an optical fiber in a mode converter according to another exemplary embodiment of the present invention.
Figure 6B:
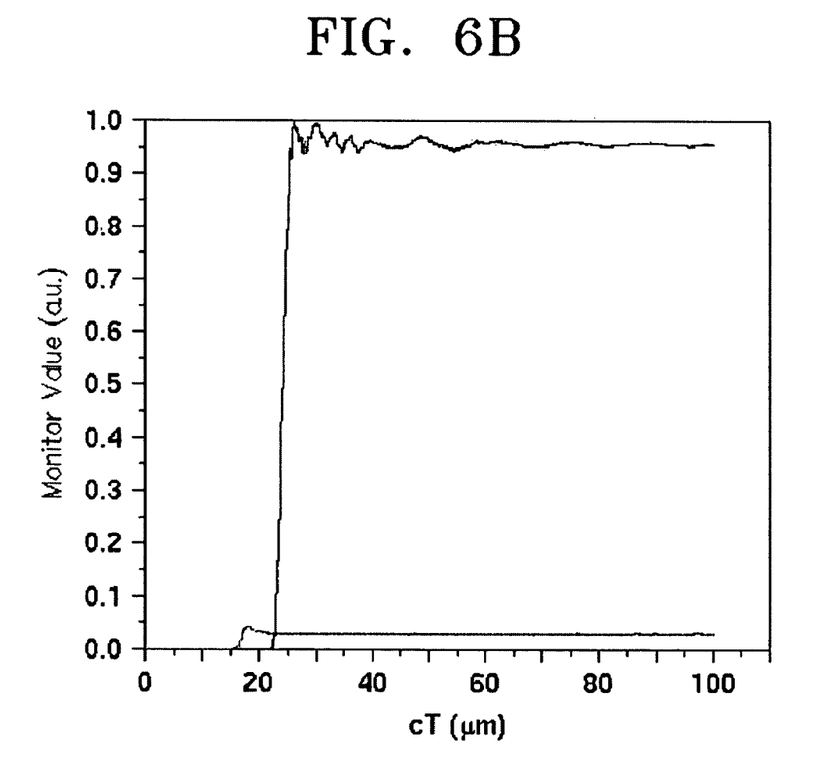
FIG. 6B is a graph of coupling ratio vs. reflectance.

FIG. 6A shows the result of a simulation of light propagating from a high refractive index waveguide to an optical fiber in a mode converter according to another exemplary embodiment of the present invention. The simulation is intended to evaluate bi-directional mode coupling in a mode converter according to an exemplary embodiment of the present invention in order to transmit/receive an optical signal. Referring to FIG. 6A, the result of the simulation shows that energy is distributed inside a waveguide bound by omnidirectional reflectors in an orderly manner while little energy is distributed outside the waveguide. Referring to FIG. 6B in which the result has been expressed numerically, the mode converter exhibits very high coupling ratio of about 90% even when a mode propagates from a high refractive index waveguide to a low refractive index waveguide.

Figure 7:
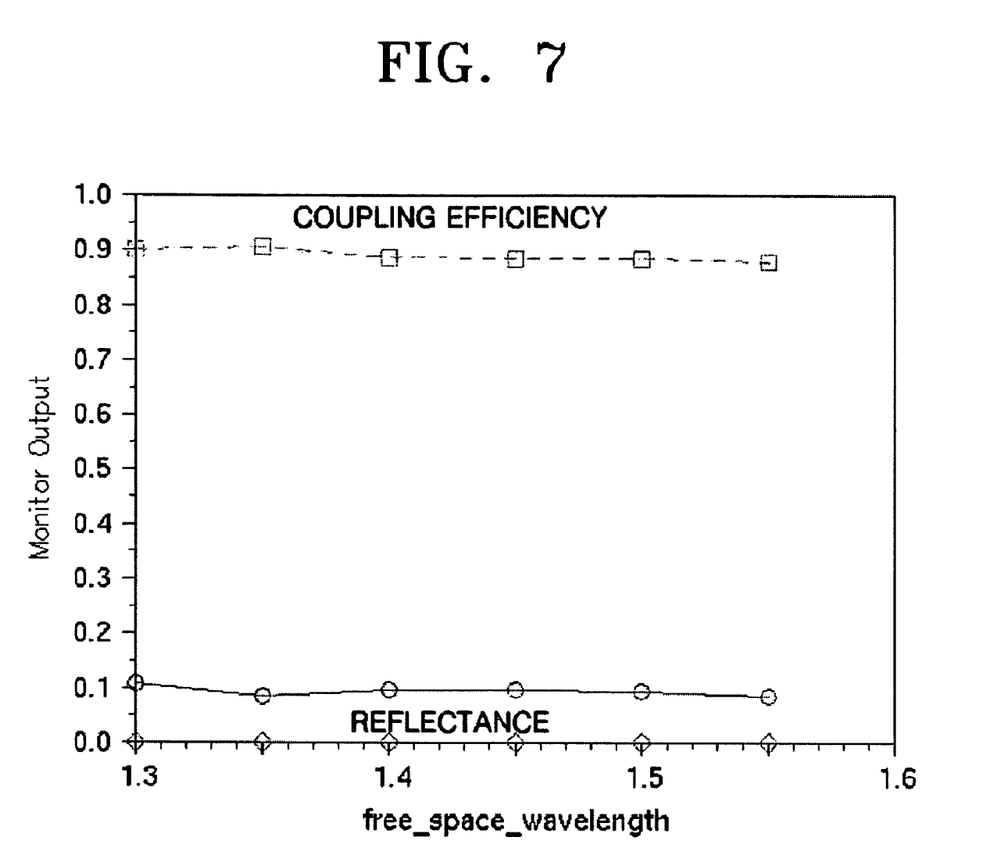
FIG. 7 is a graph illustrating coupling efficiency over a wavelength band from 1,300 to 1,550 nm in order to identify a wavelength band that can be used for a mode converter according to an exemplary embodiment of the present invention.

FIG. 7 is a graph illustrating coupling efficiency over a wavelength band from 1,300 to 1,550 nm for optical communication in order to identify a wavelength band that can be used for a mode converter according to the present invention. As illustrated in FIG. 7, the mode converter according to an exemplary embodiment of the present invention exhibits high coupling efficiency of about 90% and low reflectance of less than 10% over the wavelength range (from 1.3 to 1.55 nm), thereby allowing it to be applied to an actual optical device.

Figure 8:
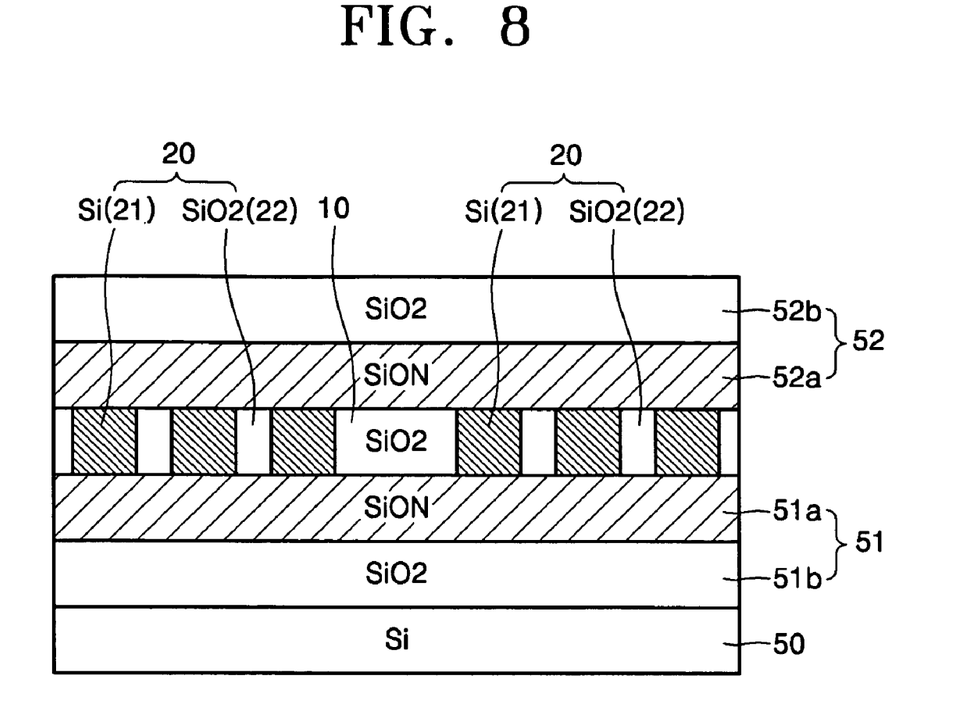
FIGS. 8 and 9 are cross-sectional views showing the structures of mode converters according to exemplary embodiments of the present invention.
Figure 9:
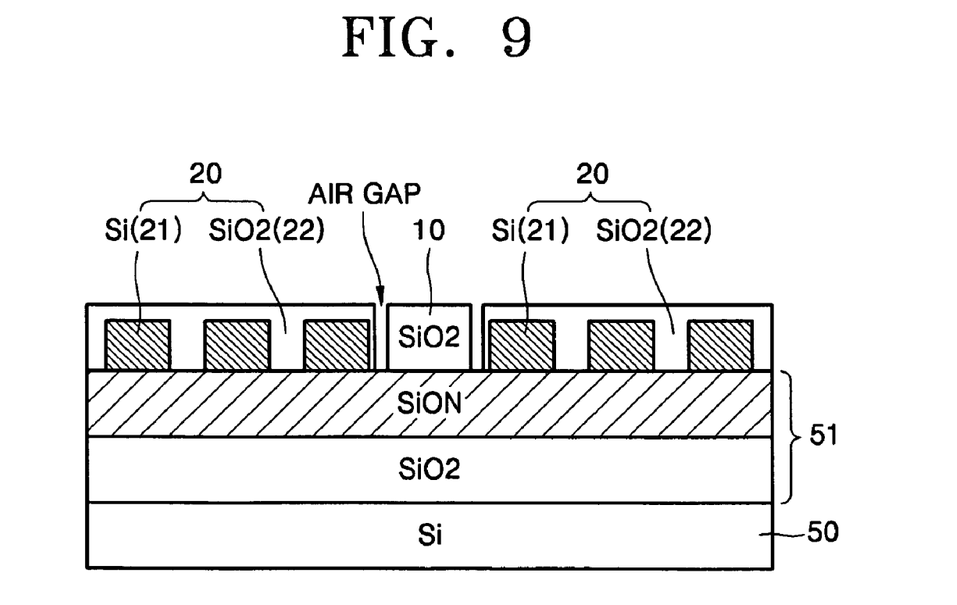

FIGS. 8 and 9 are cross-sectional views showing the structures of mode converters according to exemplary embodiments of the present invention.

Referring to FIG. 8, omnidirectional reflectors 20 are disposed on either side of a first waveguide 10 and composed of Si high refractive index layer 21 and SiO2 low refractive index layer 22, and the first waveguide 10 and the omnidirectional reflectors 20 are on the same plane. SiON Graded index (GRIN) layers 51a and 52a and SiO2 cladding layers 51b and 52b are formed above and below the first waveguide 10 and the omnidirectional reflectors 20, respectively. The stack structure is formed on the Si substrate 50.

Referring to FIG. 9, SiO2 cladding layer 51b and GRIN layer 51a are formed on the substrate 50, on which a first SiO2 waveguide 10 is centered. Omnidirectional reflectors 20 are disposed on either side of the first SiO2 waveguide 10 with an air gap sandwiched therebetween and composed of Si high refractive index layer 21 and SiO2 low refractive index layer 22. In the illustrative embodiment, the first SiO2 waveguide is surrounded by a very low refractive index air medium, and the air gap and the omnidirectional reflectors 20 forming a reflective layer are symmetrically disposed on the substrate 50.

While the illustrative embodiments show mode converts including omnidirectional reflectors made of two Si/SiO2 layers, the omnidirectional reflectors may be composed of different materials when being optimally designed according to a refractive index difference. Furthermore, while the omnidirectional reflectors are obliquely inclined, they may be designed to reduce the amount of reflection into an optical fiber as much as possible using the shape of a circle, an ellipse, a trigonometric function, or an exponential function.

That is, waveguides in the mode converter according to the present invention may be formed in various shapes so that a waveguide, in particular, a waveguide with a large mode size is optically confined by omnidirectional reflectors.

Figure 10A:
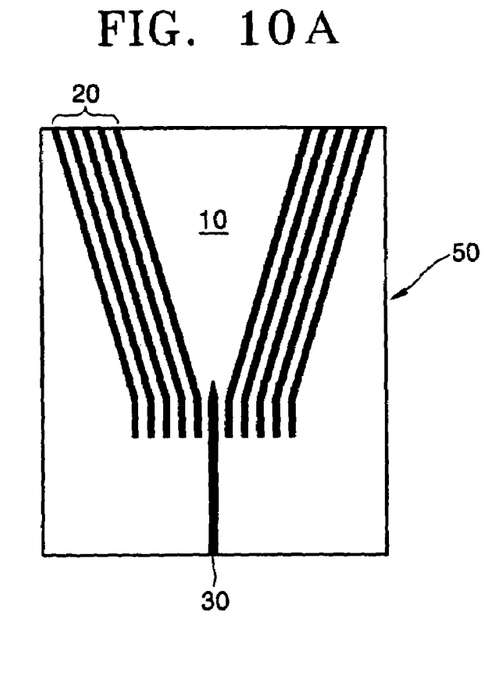
FIGS. 10A–10C illustrate modified examples of an omnidirectional reflector in a mode converter according to exemplary embodiments of the present invention.
Figure 10B:
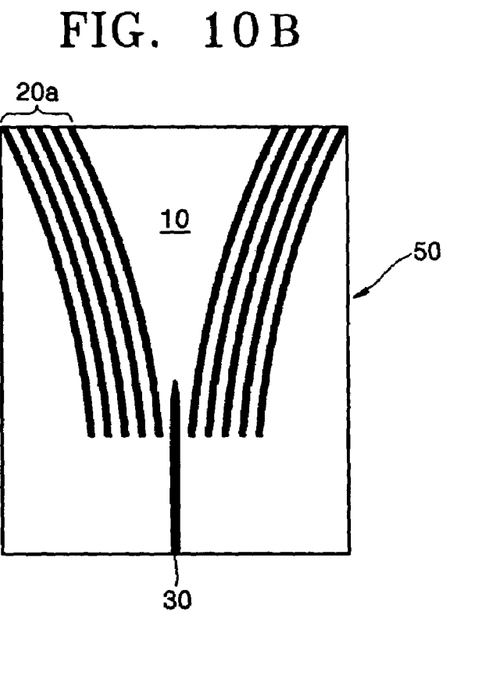
Figure 10C:
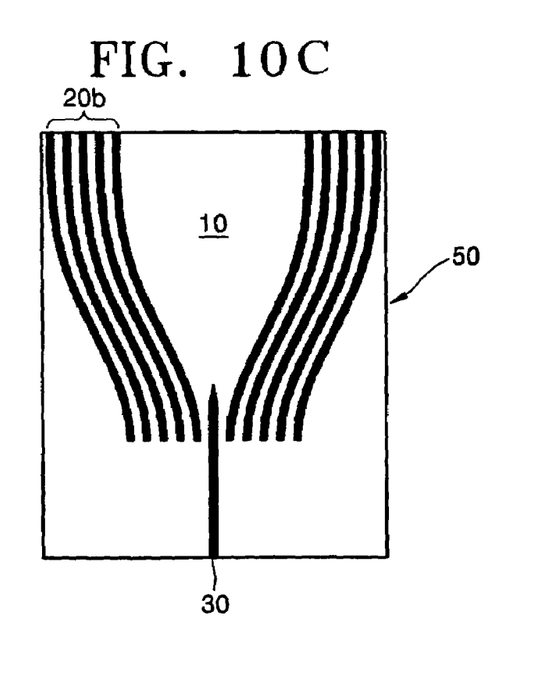

FIGS. 10A–10C illustrate modified examples of omnidirectional reflectors disposed on either side of the first waveguide in a mode converter according to the exemplary embodiments of the present invention.

FIG. 10A illustrates the omnidirectional reflector 20 shown in FIG. 1, which is linearly tapered from both sides of the waveguide 10. FIGS. 10B and 10C show omnidirectional reflectors 20a and 20b tapered exponentially and in an elliptical or curved shape from both sides of the waveguide 10, respectively.

As described above, a feature of the present invention lies in the use of a forward reflector that is disposed on either side of the low refractive index waveguide 10 and converges a mode onto the high refractive index waveguide 30 for coupling. The design details of the mode converter other than described herein conform to the specification of a typical mode converter.

The exemplary embodiments of the present invention achieve a uniform coupling efficiency over a wide wavelength range. The mode converter includes omnidirectional reflectors made of the same material as waveguides, thereby simplifying a manufacturing process. The mode converter provides a high, bi-directional coupling efficiency regardless of the direction of transmission/reception. Thus, the mode converter is designed to minimize the optical coupling loss, thereby allowing the use of a high refractive index waveguide, and to simplify the manufacturing process, thereby reducing the size and price of the device. The exemplary embodiments of the present invention are suitable for use in various devices employing a mode converter such as a coupler for an optical communication transport network.

While the present invention has been particularly shown and described with reference to exemplary embodiments thereof, the embodiments should be considered in a descriptive sense only and not for purposes of limitation. That is, the present invention should not be construed as being limited to the structures and arrangements set forth herein. It will be understood by those of ordinary skill in the art that various changes in form and details may be made therein without departing from the spirit and scope of the present invention as defined by the following claims.

What is claimed is:

1. A mode converter device comprising:
   a substrate;
   a first waveguide formed on the substrate;
   a second waveguide formed on the substrate and optically coupled into the first waveguide; and
   first and second omnidirectional reflectors disposed on first and second sidewalls of the first waveguide, respectively, and having omnidirectional reflectivity with respect to a mode propagating in the first waveguide, wherein the first and second omnidirectional reflectors each comprise a plurality of reflective layers.

2. The mode converter device of claim 1, wherein the first waveguide has a refractive index lower than that of the second waveguide.

3. The mode converter device of claim 1, wherein the first and second waveguides are made of SiO2 and Si, respectively.

4. The mode converter device of claim 1, wherein the first and second waveguides are made of SiO2 and SiN, respectively.

5. The mode converter device of claim 1, wherein the reflective layers of the first and second omnidirectional reflectors comprise a multilayer stack of alternating Si/SiO2 layers.

6. The mode converter device of claim 1, wherein a space between the first and second omnidirectional reflectors is linearly tapered toward the second waveguide.

7. The mode converter device of claim 5, wherein a space between the first and second omnidirectional reflectors is linearly tapered toward the second waveguide.

8. The mode converter device of claim 1, wherein the space between the first and second omnidirectional reflectors is non-linearly tapered toward the second waveguide.

9. The mode converter device of claim 5, wherein the space between the first and second omnidirectional reflectors is non-linearly tapered toward the second waveguide.

10. The mode converter device of claim 1, wherein one end of the second waveguide connected to the first waveguide has an acicular shape.

11. The mode converter device of claim 1, wherein an air gap is sandwiched between the first waveguide and the first and second omnidirectional reflectors.

12. The mode converter device of claim 2, wherein the reflective layers of the first and second omnidirectional reflectors comprise a multilayer stack of alternating Si/SiO2 layers.

13. The mode converter device of claim 3, wherein the reflective layers of the first and second omnidirectional reflectors comprise a multilayer stack of alternating Si/SiO2 layers.

14. The mode converter device of claim 4, wherein the reflective layers of the first and second omnidirectional reflectors comprise a multilayer stack of alternating Si/SiO2 layers.

15. The mode converter device of claim 2, wherein a space between the first and second omnidirectional reflectors is linearly tapered toward the second waveguide.

16. The mode converter device of claim 3, wherein a space between the first and second omnidirectional reflectors is linearly tapered toward the second waveguide.

17. The mode converter device of claim 4, wherein a space between the first and second omnidirectional reflectors is linearly tapered toward the second waveguide.

18. The mode converter device of claim 2, wherein the space between the first and second omnidirectional reflectors is non-linearly tapered toward the second waveguide.

19. The mode converter device of claim 3, wherein the space between the first and second omnidirectional reflectors is non-linearly tapered toward the second waveguide.

20. The mode converter device of claim 4, wherein the space between the omnidirectional first and second reflectors is non-linearly tapered toward the second waveguide.

21. The mode converter device of claim 2, wherein an air gap is sandwiched between the first waveguide and the first and second omnidirectional reflectors.

22. The mode converter device of claim 3, wherein an air gap is sandwiched between the first waveguide and the first and second omnidirectional reflectors.

23. The mode converter device of claim 4, wherein an air gap is sandwiched between the first waveguide and the first and second omnidirectional reflectors.

* * * * *